(12) United States Patent
Yokoi (10) Patent No.: US 9,651,890 B2
(45) Date of Patent: May 16, 2017

(54) EXPOSING DEVICE

(71) Applicant: BROTHER KOGYO KABUSHIKI KAISHA, Nagoya-shi, Aichi-ken (JP)

(72) Inventor: Junichi Yokoi, Nagoya (JP)

(73) Assignee: BROTHER KOGYO KABUSHIKI KAISHA, Nagoya-Shi, Aichi-Ken (JP)

( * ) Notice: Subject to any disclaimer, the term of this patent is extended or adjusted under 35 U.S.C. 154(b) by 0 days.

(21) Appl. No.: 14/864,414

(22) Filed: Sep. 24, 2015

(65) Prior Publication Data

US 2016/0091817 A1   Mar. 31, 2016

(30) Foreign Application Priority Data

Sep. 30, 2014  (JP) ................................ 2014-199756

(51) Int. Cl.
| | |
|---|---|
| *G03G 15/04* | (2006.01) |
| *G03G 15/043* | (2006.01) |
| *G06K 15/12* | (2006.01) |
| *H04N 1/40* | (2006.01) |
| *B41J 2/45* | (2006.01) |

(52) U.S. Cl.
CPC .............. *G03G 15/043* (2013.01); *B41J 2/45* (2013.01); *G03G 15/04054* (2013.01); *G06K 15/1204* (2013.01); *H04N 1/40031* (2013.01); *H04N 1/40056* (2013.01); *H04N 2201/0082* (2013.01); *H04N 2201/0094* (2013.01)

(58) Field of Classification Search
CPC ....... B41J 2/447; B41J 2/45; G03G 15/04045; G03G 15/04054; G03G 15/043
USPC .................................... 399/76, 78, 177, 220
See application file for complete search history.

(56) References Cited

U.S. PATENT DOCUMENTS

| | | |
|---|---|---|
| 5,172,132 A | 12/1992 | Haneda |
| 5,432,611 A | 7/1995 | Haneda |
| (Continued) | | |

FOREIGN PATENT DOCUMENTS

| | | |
|---|---|---|
| JP | 2006-88588 A | 4/2006 |
| JP | 2007-90758 A | 4/2007 |
| (Continued) | | |

OTHER PUBLICATIONS

Related U.S. Appl. No. 14/725,572, filed May 29, 2015.
(Continued)

*Primary Examiner* — Benjamin Schmitt
(74) *Attorney, Agent, or Firm* — Merchant & Gould P.C.

(57) ABSTRACT

An exposing unit has a plurality of light emitters arranged in a main scanning direction. The exposing unit is configured to form a scanning line by exposing an image surface in the main scanning direction, and to form a plurality of pixels arrayed in the main scanning direction by sequentially forming a plurality of scanning lines shifted in a sub-scanning direction. A clock generator is configured to generate frequency-spread clocks having frequency that is spread with a particular modulation cycle. A driver is configured to drive the exposing unit to emit light during a lighting period based on the frequency-spread clocks. The driver sets an interval of exposure start time of the plurality of scanning lines. At least one interval is different from a reference period obtained by dividing a period for forming the pixels arrayed in the main scanning direction by a number of the plurality of scanning lines.

19 Claims, 7 Drawing Sheets

(56) References Cited

U.S. PATENT DOCUMENTS

| | | |
|---|---|---|
| 5,737,006 A | 4/1998 | Wong |
| 6,825,457 B2 | 11/2004 | Sakamoto |
| 2003/0025785 A1 | 2/2003 | Nihei et al. |
| 2004/0100548 A1* | 5/2004 | Seki ............... H04N 1/053 |
| | | 347/119 |
| 2008/0079025 A1 | 4/2008 | Inoue |
| 2011/0012983 A1 | 1/2011 | Itabashi |

FOREIGN PATENT DOCUMENTS

| | | |
|---|---|---|
| JP | 2007-125785 A | 5/2007 |
| JP | 2014-049938 A | 3/2014 |

OTHER PUBLICATIONS

Office Action issued in related U.S. Appl. No. 14/725,572, mailed Mar. 10, 2016.
U.S. Office Action issued in related U.S. Appl. No. 14/725,572, mailed Oct. 7, 2016.
U.S. Office Action (Notice of Allowance) issued in related U.S. Appl. No. 14/725,572 on Feb. 3, 2017.

* cited by examiner

EXPOSING DEVICE

CROSS REFERENCE TO RELATED APPLICATIONS

This application claims priority from Japanese Patent Application No. 2014-199756 filed Sep. 30, 2014. The entire content of the priority application is incorporated herein by reference.

TECHNICAL FIELD

An aspect of this disclosure relates to an exposing device and an image forming apparatus having the exposing device.

BACKGROUND

In exposure control of an exposing device, it is known that frequency of clocks is modulated by a spread spectrum method in order to reduce radiation noises. In such technology, since lighting period depends on the clock, the exposure amount of each pixel differs at parts where frequency of clocks is high and at parts where frequency of clocks is low, and density variation is generated in an image. In a known technology, by setting a scanning cycle for scanning one scanning line and a modulation cycle of clocks so as to have a particular relationship, phases of modulated waveform (change of frequency of clocks) are shifted among a plurality of scanning lines, thereby correcting density variation of an image.

SUMMARY

According to one aspect, this specification discloses an exposing device. The exposing device includes an exposing unit, a clock generator, and a driver. The exposing unit has a plurality of light emitters arranged in a main scanning direction. The exposing unit is configured to form a scanning line by exposing an image surface in the main scanning direction, and to form a plurality of pixels arrayed in the main scanning direction by sequentially forming a plurality of scanning lines shifted in a sub-scanning direction. The clock generator is configured to generate frequency-spread clocks having frequency that is spread with a particular modulation cycle. The driver is configured to drive the exposing unit to emit light during a lighting period based on the frequency-spread clocks. The driver is configured to set an interval of exposure start time of the plurality of scanning lines. At least one interval is different from a reference period that is obtained by dividing a period for forming the plurality of pixels arrayed in the main scanning direction by a number of the plurality of scanning lines.

According to another aspect, this specification discloses an exposing device. The exposing device includes an exposing unit, a clock generator, and a driver. The exposing unit has a plurality of light emitters arranged in a main scanning direction. The exposing unit is configured to form a scanning line by exposing an image surface in the main scanning direction, and to form a plurality of pixels arrayed in the main scanning direction by sequentially forming a plurality of scanning lines shifted in a sub-scanning direction. The clock generator is configured to generate frequency-spread clocks having frequency that is spread with a particular modulation cycle. The driver is configured to drive the exposing unit to emit light during a lighting period based on the frequency-spread clocks. A reference period Tref is defined as a period that is obtained by dividing a period for forming the plurality of pixels arrayed in the main scanning direction by a number of the plurality of scanning lines n. When reference time $tref_1$ is defined as time identical to exposure start time $ts_1$, and reference times $tref_2$ to $tref_n$ are defined as respective times shifted from the reference time $tref_1$ by the reference period Tref, at least one exposure start time $ts_k$ out of exposure start times $ts_2$ to $ts_n$ of each scanning line is different from a reference time $tref_k$.

According to still another aspect, this specification also discloses an image forming apparatus. The image forming apparatus includes a photosensitive member, an exposing unit, a clock generator, and a driver. The photosensitive member is configured that an electrostatic latent image is formed thereon. The exposing unit has a plurality of light emitters arranged in a main scanning direction. The exposing unit is configured to form a scanning line by exposing the photosensitive member in the main scanning direction, and to form a plurality of pixels arrayed in the main scanning direction by sequentially forming a plurality of scanning lines shifted in a sub-scanning direction. The clock generator is configured to generate frequency-spread clocks having frequency that is spread with a particular modulation cycle. The driver is configured to drive the exposing unit to emit light during a lighting period based on the frequency-spread clocks. The driver is configured to set an interval of exposure start time of the plurality of scanning lines. At least one interval is different from a reference period that is obtained by dividing a period for forming the plurality of pixels arrayed in the main scanning direction by a number of the plurality of scanning lines.

BRIEF DESCRIPTION OF THE DRAWINGS

Embodiments in accordance with this disclosure will be described in detail with reference to the following figures wherein:

FIG. 6 is a diagram showing relationship among a reference period, each exposure start time, and so on;

DETAILED DESCRIPTION

A spread spectrum modulation cycle depends on configurations of an ASIC (Application Specific Integrated Circuit), a circuit, and so on. On the other hand, a scanning cycle need to be adjusted based on a paper feeding speed, drum sensitivity, and so on. Thus, the modulation cycle need to be changeable so as to have a particular relationship with the scanning cycle, which makes the configurations of the ASIC and the circuit complicated.

Some aspects of this disclosure will be described while referring to the accompanying drawings.

In the following description, directions are defined as viewed from a user who uses a color printer which is described as an example of an image forming apparatus. That is, in FIG. 1, the left side in the drawing sheet is defined as "front side", the right side in the drawing sheet is defined as "rear side", the back side of the drawing sheet is defined as "left side", and the near side of the drawing sheet is defined as "right side". Further, the upper-lower direction in the drawing sheet is defined as "upper-lower direction".

Figure 1:
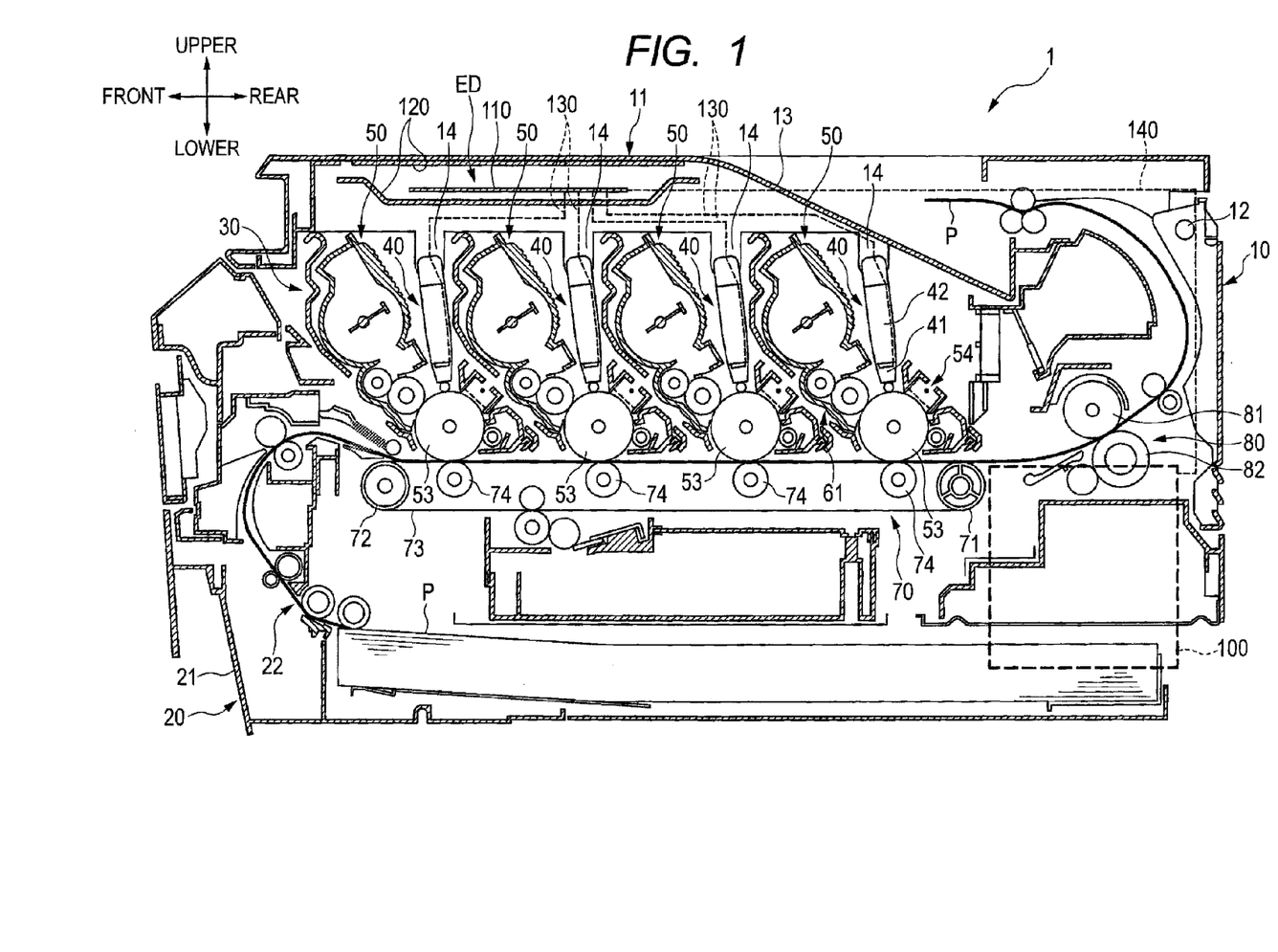
FIG. 1 is a cross-sectional view showing the overall configuration of a color printer according to an embodiment of this disclosure.

As shown in FIG. 1, the color printer 1 includes, within a main casing 10, a paper feeding unit 20 that feeds paper P, an image forming unit 30 that forms an image on fed paper P, a paper discharging unit 90 that discharge paper P on which an image is formed, and a main board 100 that controls each unit when an image is formed.

An upper cover 11 is provided at an upper part of the main casing 10 for opening and closing an opening formed in the main casing 10. The upper cover 11 is pivotally movable upward and downward about a pivotal shaft 12 provided at the rear side. An upper surface of the upper cover 11 serves as a paper discharging tray 13 that accommodates paper P discharged from the main casing 10. A plurality of holding members 14 each holding an LED unit 40 is provided at a lower surface of the upper cover 11. An LED control board 110 and a shielding plate 120 facing the LED control board 110 are provided in the upper cover 11.

The paper feeding unit 20 mainly includes a paper feeding tray 21 and a paper feeding mechanism 22. The paper feeding tray 21 is provided at a lower part in the main casing 10, and is detachably mounted on the main casing 10. The paper feeding mechanism 22 conveys paper P from the paper feeding tray 21 to the image forming unit 30.

In the paper feeding unit 20 having this configuration, paper P in the paper feeding tray 21 is separated one sheet at a time and conveyed upward, and is fed to the image forming unit 30.

The image forming unit 30 mainly includes an exposing device ED, four process cartridges 50, a transfer unit 70, and a fixing unit 80. The exposing device ED includes the LED control board 110 and the four LED units 40.

Each LED unit 40 is provided above a photosensitive drum 53 (an example of a photosensitive member), and mainly includes an LED head 41 and a back plate 42. The LED head 41 is provided to face the photosensitive drum 53.

Figure 2A:
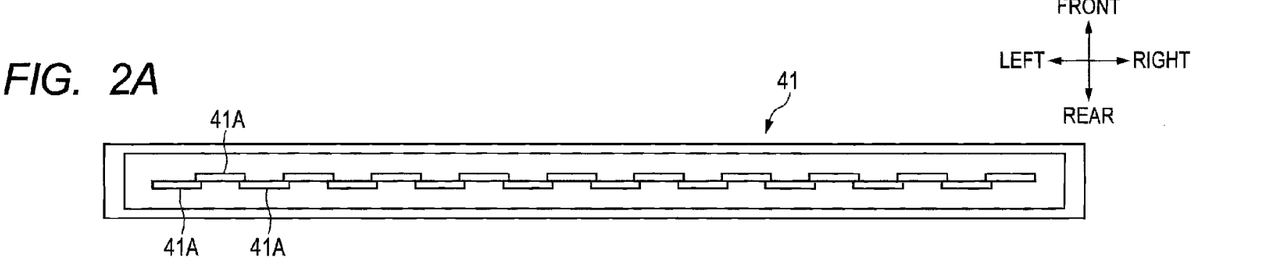
FIG. 2A shows an LED unit as viewed from the lower side.

As shown in FIG. 2A, the LED head 41 has twenty (20) SLED (Self-Scanning Light Emitting Device) chips 41A (an example of an exposing unit) in a surface facing the photosensitive drum 53. The SLED chips 41A are arranged in a staggered manner along a main scanning direction (left-right direction). Specifically, ten (10) pairs of SLED chips 41A are arranged along the left-right direction, each pair having a pair of SLED chips 41A adjacent to each other in the left-right direction and shifted in the front-rear direction.

Figure 2B:
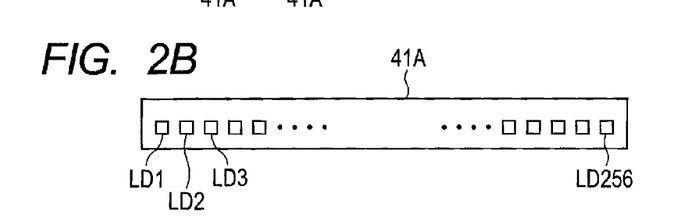
FIG. 2B is an enlarged view of an SLED chip.
Figure 2C:
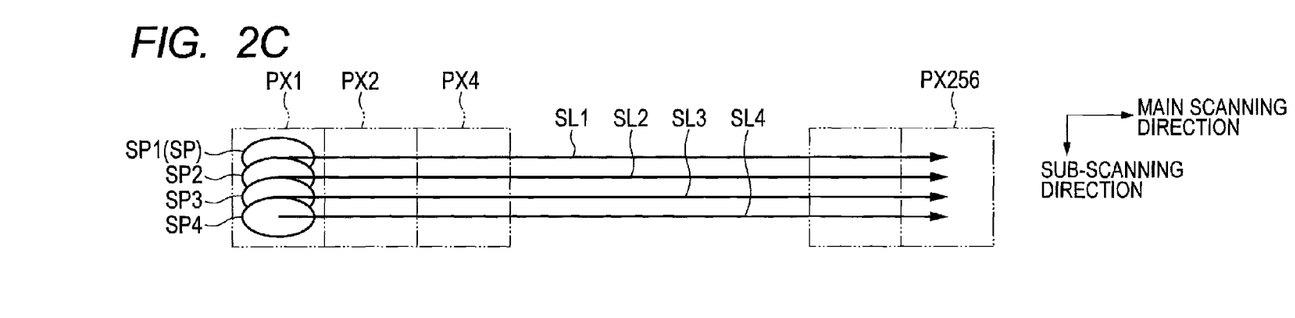
FIG. 2C is a diagram showing relationships among pixels, scanning lines and exposure spots.

As shown in FIG. 2B, the SLED chip 41A has 256 light emitting elements LD (LD1 to LD256) (an example of a plurality of light emitters arranged in the main scanning direction). In each SLED chip 41A, the light emitting elements LD are controlled to blink (turn on and off) sequentially from the first light emitting element LD1 to the 256th light emitting element LD256, in a particular exposure period Te. With this operation, as shown in FIG. 2C, a surface (image surface) of the photosensitive drum 53 is scanningly exposed in the main scanning direction, so as to form one scanning line SL (for example, a scanning line SL1 as the first line). Specifically, each SLED chip 41A is controlled to start blinking at the same time and is controlled to finish blinking at the same time. When each SLED chip 41A is controlled to finish blinking at the same time, one scanning line SL is formed.

In the present embodiment, a plurality of pixels PX (PX1 to PX256) arranged in the main scanning direction is formed by four scanning lines SL1 to SL4 shifted in a sub-scanning direction. Specifically, exposure spots SP are formed on the photosensitive drum 53 by one light emitting element LD as an electrostatic latent image, and rotation of the photosensitive drum 53 causes the exposure spots SP to be sequentially superposed while being shifted in the sub-scanning direction, so that one pixel PX is formed. In the following description, the scanning line SL1 of the first line is also referred to as a first scanning line SL1, the scanning line SL2 of the second line is also referred to as a second scanning line SL2, the scanning line SL3 of the third line is also referred to as a third scanning line SL3, and the scanning line SL4 of the fourth line is also referred to as a fourth scanning line SL4. In the following descriptions, the exposure spot SP formed by the first scanning line SL1 is referred to as SP1, the exposure spot SP formed by the second scanning line SL2 is referred to as SP2, the exposure spot SP formed by the third scanning line SL3 is referred to as SP3, and the exposure spot SP formed by the fourth scanning line SL4 is referred to as SP4.

And, each SLED chip 41A receives signals from the LED control board 110 based on data of an image to be formed, and controls each light emitting element LD1 to LD256 to turn on, thereby exposing the surface of the photosensitive drum 53 to light. The configuration and so on of the LED control board 110 will be described in detail.

Returning to FIG. 1, the back plate 42 is a member for supporting the LED head 41. The back plate 42 is pivotally attached to the upper cover 11 via the holding member 14. With this configuration, by pivotally moving the upper cover 11 upward, the LED unit 40 moves from an exposure position facing the photosensitive drum 53 to a retracted position located above the exposure position.

The process cartridges 50 are arranged in the front-rear direction between the upper cover 11 and the paper feeding unit 20. Each process cartridge 50 includes the photosensitive drum 53, a charger 54, and a developing unit 61. The process cartridge 50 is exchangeable through the opening of the main casing 10 in a state where the upper cover 11 is pivotally moved upward. In each process cartridge 50, only color of toner (developer) stored in the developing unit 61 is different, and the configuration of each process cartridge 50 is the same.

The transfer unit 70 is provided between the paper feeding unit 20 and each process cartridge 50. The transfer unit 70 mainly includes a drive roller 71, a follow roller 72, a conveying belt 73, and transfer rollers 74.

The drive roller 71 and the follow roller 72 are arranged in parallel and spaced away from each other in the front-rear direction. The conveying belt 73 constituted by an endless belt is looped between the drive roller 71 and the follow roller 72.

The fixing unit 80 is disposed at a rear side of the process cartridges 50 and the transfer unit 70. The fixing unit 80 includes a heat roller 81 and a pressure roller 82 that is disposed to face the heat roller 81 and to press the heat roller 81.

In the image forming unit 30 having the above-described configuration, first, the surface of each photosensitive drum 53 is uniformly charged by the charger 54, and then is exposed to LED light emitted from each LED head 41. With this operation, an electrostatic latent image based on image data is formed on each photosensitive drum 53.

And, toner is supplied to the electrostatic latent image from the developing unit 61, and a toner image is formed on each photosensitive drum 53.

And, when paper P supplied onto the conveying belt 73 passes between each photosensitive drum 53 and the corresponding transfer roller 74 disposed inside the conveying belt 73, the toner image formed on each photosensitive drum 53 is sequentially transferred onto paper P. When paper P passes between the heat roller 81 and the pressure roller 82, the toner image transferred onto paper P is thermally fixed.

The paper P on which the toner image is transferred and thermally fixed is discharged to outside of the main casing 10, and is accumulated in the paper discharging tray 13.

Figure 3:
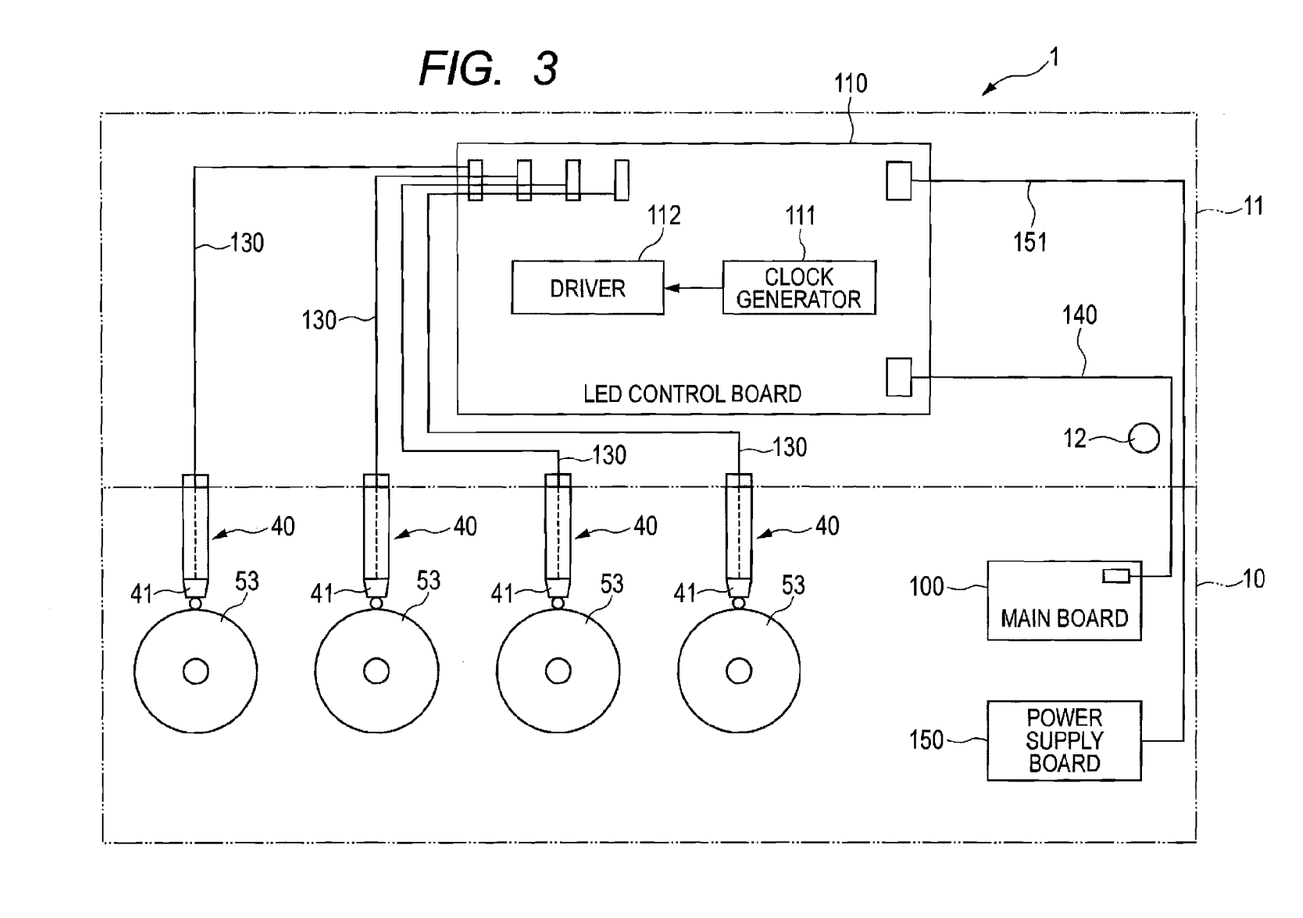
FIG. 3 is a diagram showing the configuration and wiring of an LED control board.

Next, the configuration and wiring structure around the LED control board 110 will be described in detail. First, the wiring structure will be described briefly.

As shown in FIG. 3, the main board 100 controls each part of the color printer 1 at the time of image formation. Specifically, the main board 100 controls rotational speeds of the photosensitive drum 53 and the drive roller 71, conveying speed of paper P in the paper feeding unit 20 and the fixing unit 80, timing of light emission of each light emitting element LD, and so on. The main board 100 controls these values directly or indirectly via another control board (for example, the LED control board 110), and so on.

The LED control board 110 outputs signals to each SLED chip 41A of each LED head 41 based on data of an image to be formed, and controls light emission of each SLED chip 41A.

Each LED head 41 is electrically connected to the LED control board 110 by flat cables 130 having a plurality of signal lines. Further, the LED control board 110 is electrically connected to the main board 100 by a flat cable 140 having a plurality of signal lines.

In the present embodiment, electric power of the LED control board 110 is supplied from a power supply board 150 that is provided within the main casing 10 separately from the main board 100. A cable 151 pulled out from the power supply board 150 is connected to the LED control board 110.

Next, the configuration of the LED control board 110 will be described in detail. The LED control board 110 includes a clock generator 111 and a driver 112.

Figure 4A:
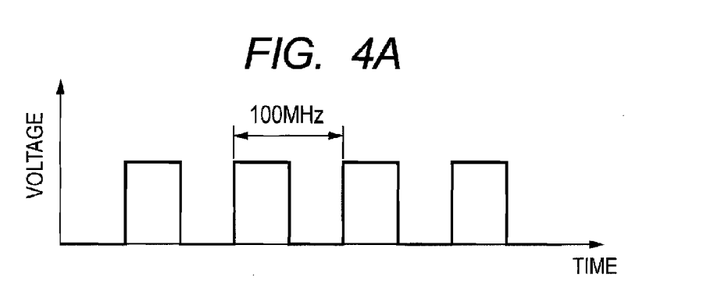
FIG. 4A is a diagram showing clocks generated with a reference frequency.
Figure 4B:
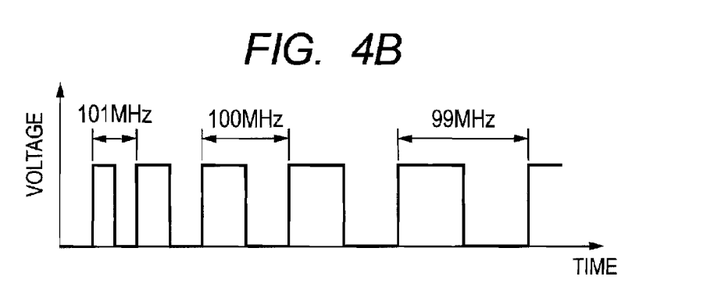
FIG. 4B is a diagram showing clocks with frequency spread.

The clock generator 111 is configured to spread frequency of clocks (pulse signals) of a constant period (for example, 100 MHz) shown in FIG. 4A with a particular modulation cycle Tm, thereby generating frequency-spread clocks shown in FIG. 4B. Specifically, the clock generator 111 is constituted by an SSCG (Spread Spectrum Clock Generator). That is, the frequency of frequency-spread clocks changes by ±a few percent (for example, 1%) around a reference frequency fb (for example, 100 MHz).

Figure 5:
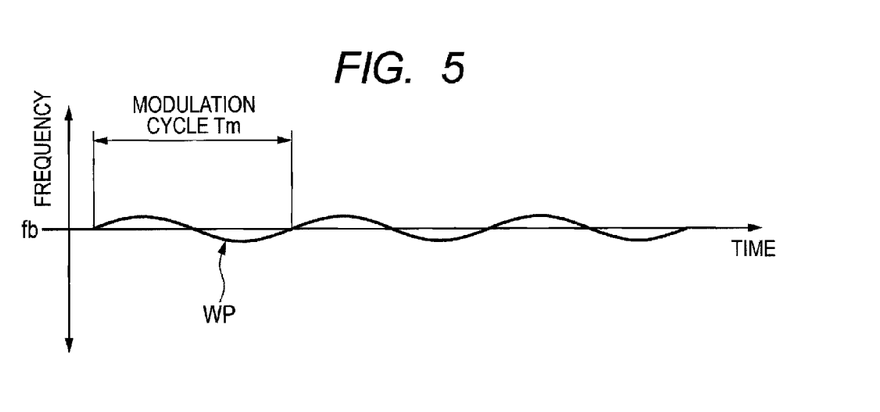
FIG. 5 is a diagram showing a modulation cycle.

Specifically, as shown in FIG. 5, the frequency of clocks changes in accordance with changes of a modulated waveform WP corresponding to the modulation cycle Tm. Here, the vertical axis of the graph in FIG. 5 is the frequency of clocks. In the present embodiment, the modulated waveform WP is such a waveform that the frequency changes with respect to time in a sine-curve shape.

The driver 112 is configured to drive each light emitting element LD1 to LD256 of each LED head 41 to emit light during a period that is determined based on frequency-spread clocks. Specifically, the driver 112 drives one light emitting element LD to emit light during a period corresponding to a particular number of clocks (for example, 52 clocks), thereby forming one exposure spot SP. More specifically, if the clock number allocated to one exposure spot SP is 72 clocks, for example, the driver 112 drives the light emitting element LD to emit light during a period corresponding to 52 clocks out of 72 clocks, thereby forming one exposure spot SP. In this example, a period required for blinking control from the first light emitting element LD1 to the 256th light emitting element LD256, that is, the above-mentioned exposure period Te is 18432 (72×256) clocks.

And, in a case where one pixel PX is formed by using four exposure spots SP, the driver 112 drives the light emitting element LD to emit light during a period corresponding to a clock number (for example, 208 clocks) that is four times the above-described particular number of clocks (for example, 52 clocks) for one pixel PX.

Figure 6:
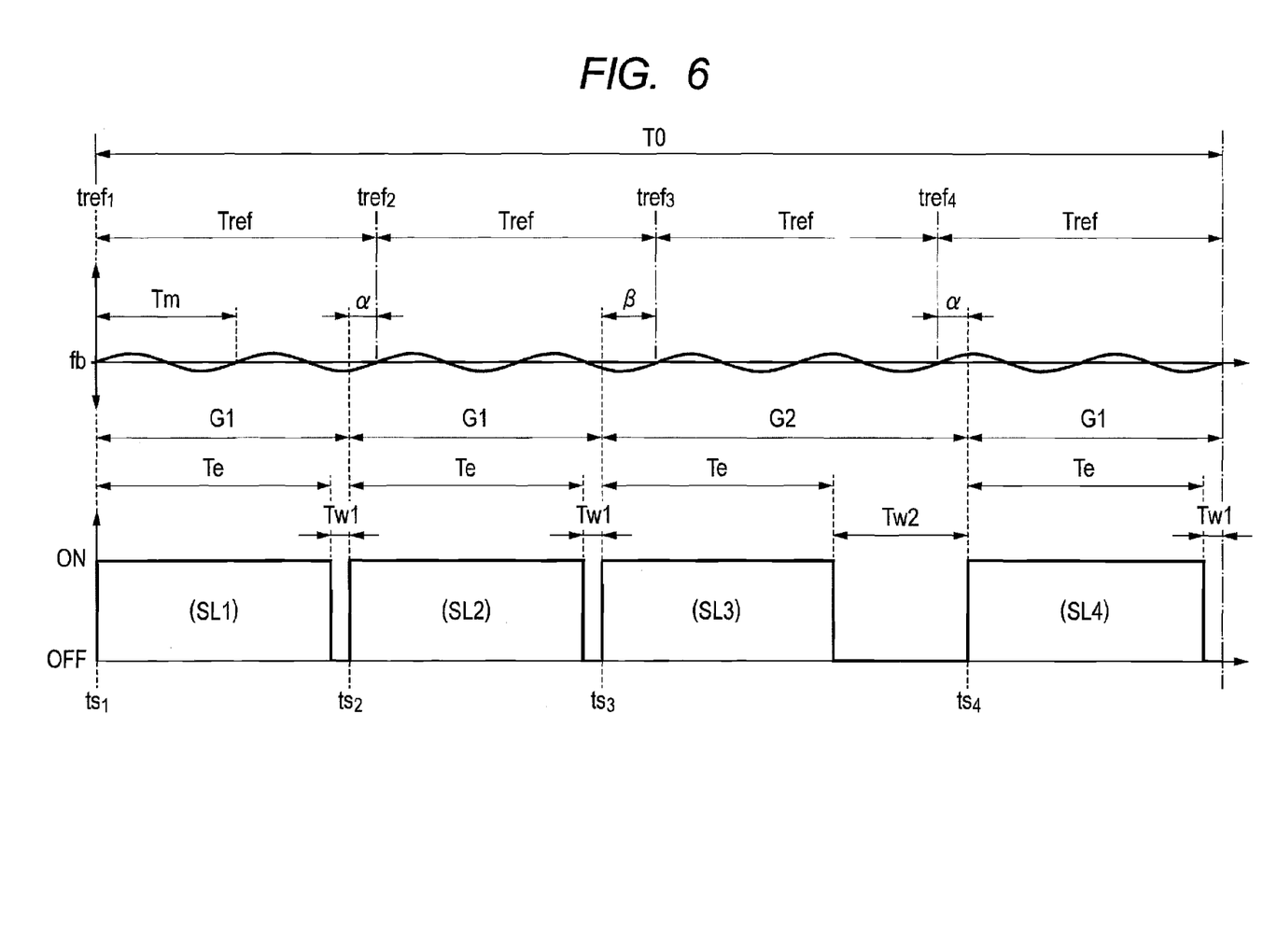

Next, settings for determining timing of exposure start of each scanning line SL1 to SL4 will be described while referring to FIG. 6. In FIG. 6, a reference period Tref is a period that is obtained by dividing a pixel forming period T0 by the number of the plurality of scanning lines SL1 to SL4 (n=4). Here, the pixel forming period T0 is a period required for forming the plurality of pixels PX1 to PX256 arranged in the main scanning direction. Specifically, the pixel forming period T0 is a period from timing when exposure of the first scanning line SL1 is started to timing when exposure of the fourth scanning line SL4 is finished and exposure of the first scanning line forming the next pixel is started. Further, reference times $tref_1$ to $tref_4$ is time corresponding to each exposure start time $ts_1$ to $ts_4$ of each scanning line SL1 to SL4. That is, the reference time $tref_1$ is defined as time identical to the exposure start time $ts_1$. The reference times $tref_2$ to $tret_n$ (N=4 in FIG. 6) are defined as respective times shifted from the reference time $tref_1$ by the reference period Tref, such that the reference time $tref_{k+1}$ is shifted from the previous reference time $tref_k$ by the reference period Tref. In the example shown in FIG. 6, the exposure start times $ts_2$, $ts_3$, and $ts_4$ are different from the corresponding reference times $tref_2$, $tref_3$, and $tref_4$, respectively.

Generally, when a plurality of scanning lines shifted in the sub-scanning direction is scanned, writing start (exposure start) of each scanning line is performed with a certain cycle. Hence, the reference period Tref calculated by the above-described calculation method corresponds to a scanning cycle that is used in normal LED control for performing writing start timing of each scanning line at certain timing. In the present embodiment, writing start timing of each scanning line SL1 to SL4 is not performed with a certain cycle (reference period Tref), but the writing start timing of the fourth scanning line SL4 is set to timing different from the other scanning lines SL1 to SL3.

Further, in the present embodiment, the reference period Tref and the pixel forming period T0 are integral multiples of the modulation cycle Tm. Specifically, the reference period Tref is twice of the modulation cycle Tm, and the pixel forming period T0 is eight times of the modulation cycle Tm. Further, the exposure period Te is set to a length shorter than or equal to 90% of the reference period Tref.

Note that the reference period Tref and the pixel forming period T0 may be different from an integral multiple of the modulation cycle Tm.

Further, in FIG. 6, "ON" indicates that each light emitting element LD1 to LD256 is controlled to blink, and "OFF" indicates that each light emitting element LD1 to LD256 is controlled not to blink.

As shown in FIG. 6, each of an interval from exposure start time $ts_1$ of the first scanning line SL1 to exposure start time $ts_2$ of the second scanning line SL2, and an interval from exposure start time $ts_2$ of the second scanning line SL2 to exposure start time $ts_3$ of the third scanning line SL3 is set to a first interval G1 shorter than the reference period Tref. Further, an interval from exposure start time $ts_3$ of the third scanning line SL3 to exposure start time $ts_4$ of the fourth scanning line SL4 is set to a second interval G2 longer than the reference period Tref. Furthermore, an interval from exposure start time $ts_4$ of the fourth scanning line SL4 to exposure start time $ts_1$ of the first scanning line SL1 for forming the next pixel PX is set to the first interval G1.

Specifically, the first interval G1 is set to a period that is obtained by adding the exposure period Te to a first waiting period Tw1. The second interval G2 is set to a period that is obtained by adding the exposure period Te to a second waiting period Tw2 longer than the first waiting period Tw1. Here, if each scanning lines SL1 to SL4 is formed in the first interval G1, there is an extra period of 4·(Tref-G1) compared with a case in which each scanning line SL1 to SL4 is formed in the reference period Tref. Here, Tref-G1 corresponds to a first period α described later. In the present embodiment, all of this extra period 4·α is used as part of the second waiting period Tw2. Specifically, the second waiting period Tw2 is a value obtained by adding the first waiting period Tw1 to the above-described extra period 4·α. Note that, by setting the exposure period Te to a length shorter than or equal to 90% of the reference period Tref, the settings of the first waiting period Tw1 and the second waiting period Tw2 have a degree of freedom.

The exposure period Te is a period in which scanning exposure is actually performed (a period in which blinking control is actually performed from the first light emitting element LD1 to the 256th light emitting element LD256), and is set to the same period for each of the scanning lines SL1 to SL4. On the other hand, the waiting periods Tw1, Tw2 are vacant periods from a time point when the 256th light emitting element LD256 finishes blinking to a time point when the next first light emitting element LD1 starts blinking. That is, the waiting periods Tw1, Tw2 are periods in which the light emitting elements LD1 to LD256 are controlled not to blink at all.

By setting intervals of the exposure start time $ts_1$ to $ts_4$ of each scanning line SL1 to SL4 in this way, each exposure start time $ts_2$ to $ts_4$ of the second scanning line SL2, the third scanning line SL3, and the fourth scanning line SL4 is different from each reference times $tref_2$ to $tref_4$ corresponding to the second scanning line SL2, the third scanning line SL3, and the fourth scanning line SL4. In other words, a relationship between the exposure start time $ts_k$ of the k-th scanning line and the reference time $tref_k$ corresponding to the exposure start time $ts_k$ is $ts_k = tref_k$ when k=1, and is $ts_k \neq tref_k$ when k=2,3,4.

Specifically, the exposure start time $ts_2$ of the second scanning line SL2 is set to time earlier than the reference time $tref_2$ corresponding to the exposure start time $ts_2$ by a first period α, and the exposure start time $ts_3$ of the third scanning line SL3 is set to time earlier than the reference time $tref_3$ corresponding to the exposure start time $ts_3$ by a second period β. Here, the second period β is twice the length of the first period α. Further, the exposure start time $ts_4$ of the fourth scanning line SL4 is set to time that is later than the reference time $tref_4$ corresponding to the exposure start time $ts_4$ by the first period α.

The number of the scanning lines (SL1, SL2, SL4) scanned during the first interval G1 shorter than the reference period Tref is larger than the number of the scanning line (SL3) scanned during the second interval G2 longer than the reference period Tref. In other words, the number of the scanning line (SL2, SL3) for which scanning is started at exposure start time earlier than the corresponding reference time, out of the plurality of scanning lines SL1 to SL4, is larger than the number of the scanning line (SL4) for which scanning is started at exposure start time later than the corresponding reference time.

By shifting each exposure start time $ts_2$ to $ts_4$ of the scanning line SL2 of SL4 of the second to fourth lines from each reference time $tref_2$ to $tref_4$ as described above, as shown in FIG. 7A, the phase of each modulated waveform WP1 to WP4 corresponding to each scanning line SL1 to SL4 can be shifted from one another. Specifically, each of the exposure start time $ts_1$ of the first scanning line SL1 and the exposure start time $ts_3$ of the third scanning line SL3 is set such that the phase of the modulated waveform WP1 corresponding to the first scanning line SL1 and the phase of the modulated waveform WP3 corresponding to the third scanning line SL3 are shifted by approximately π (pi) so that the two waves interfere and compensate each other. Further, each of the exposure start time $ts_2$ of the second scanning line SL2 and the exposure start time $ts_4$ of the fourth scanning line SL4 is set such that the phase of the modulated waveform WP2 corresponding to the second scanning line SL2 and the phase of the modulated waveform WP4 corresponding to the fourth scanning line SL4 are shifted by approximately π (pi) so that the two waves interfere and compensate each other.

Figure 7A:
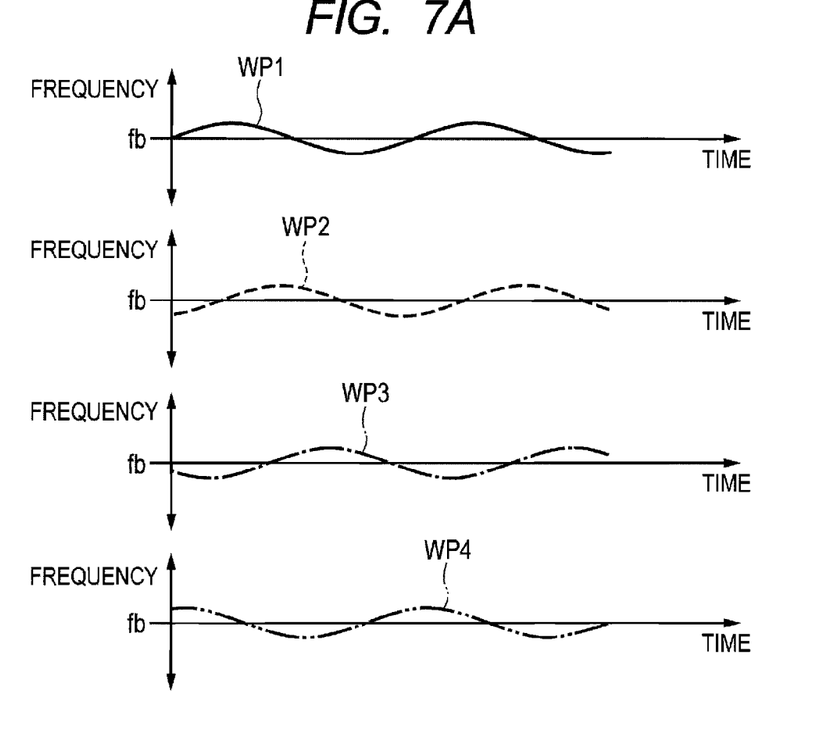
FIG. 7A is a diagram showing a modulated waveform of each scanning line.
Figure 7B:
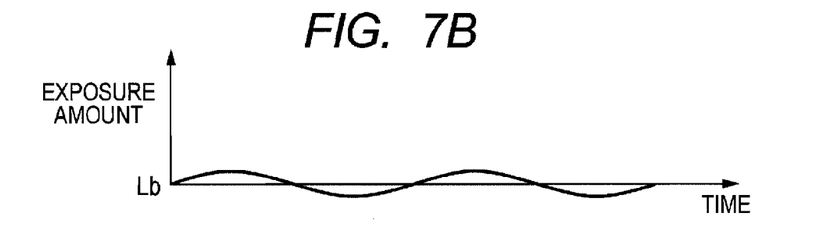
FIG. 7B is a diagram showing changes of exposure amounts of a plurality of pixels.

More specifically, an interval (2·G1) between the exposure start time $ts_1$ of the first scanning line SL1 and the exposure start time $ts_3$ of the third scanning line SL3 is a period of approximately 3.5 times of the modulation cycle Tm. Thus, the modulated waveforms WP1 and WP3 compensate each other. Further, an interval (G1+G2) between the exposure start time $ts_2$ of the second scanning line SL2 and the exposure start time $ts_4$ of the fourth scanning line SL4 is a period of approximately 4.5 times of the modulation cycle Tm. Thus, the modulated waveforms WP2 and WP4 also compensate each other. That is, each of the interval of the exposure start time $ts_1$, $ts_3$ and the interval of the exposure start time $ts_2$, $ts_4$ is close to a period that is obtained by adding an integral multiple of the modulation cycle Tm to a half-cycle period of the modulation cycle Tm and, as shown in FIG. 7B, each modulated waveform WP1 to WP4 compensate one another. This reduces deviations of exposure amount of the plurality of pixels PX relative to a reference value Lb.

As an example, in a case where the reference period Tref is twice the length of the modulation cycle Tm, by setting the above-described first period α to a period of ¼ of the modulation cycle Tm, the interval (2·G1) of the exposure start time $ts_1$, $ts_3$ and the interval (G1+G2) of the exposure start time $ts_2$, $ts_4$ can be set to periods by which each modulation waveform WP1 to WP4 are canceled (compensated). The reason is as follows. Each interval (2·G1), (G1+G2) is represented by the modulation cycle Tm and α as below.

$$2 \cdot G1 = 2 \cdot Tref - 2 \cdot \alpha = 4 \cdot Tm - 2 \cdot \alpha$$

$$G1 + G2 = 2 \cdot Tref + 2\alpha = 4 \cdot Tm + 2\alpha$$

And, when the period of each interval (2·G1), (G1+G2) is obtained by adding an integral multiple of the modulation cycle Tm to a half-cycle period of the modulation cycle Tm, α is derived as below.

$$2 \cdot \alpha = Tm/2$$

$$\alpha = Tm/4$$

When the reference period Tref is twice the length of the modulation cycle Tm, by setting the each exposure start time $ts_1$ to $ts_4$ as described above, modulated waveforms WP1 to WP4 corresponding to each scanning line SL1 to SL4 are compensated.

Specifically, the exposure start time $ts_2$ of the second scanning line SL2 is earlier than the corresponding reference time $tref_2$ by Tm/4 (=α). The exposure start time $ts_3$ of the third scanning line SL3 is earlier than the corresponding reference time $tref_3$ by Tm/2 (=β=2α). The exposure start time $ts_4$ of the fourth scanning line SL4 is later than the corresponding reference time $tref_4$ by Tm/4 (=α).

Figure 8A:
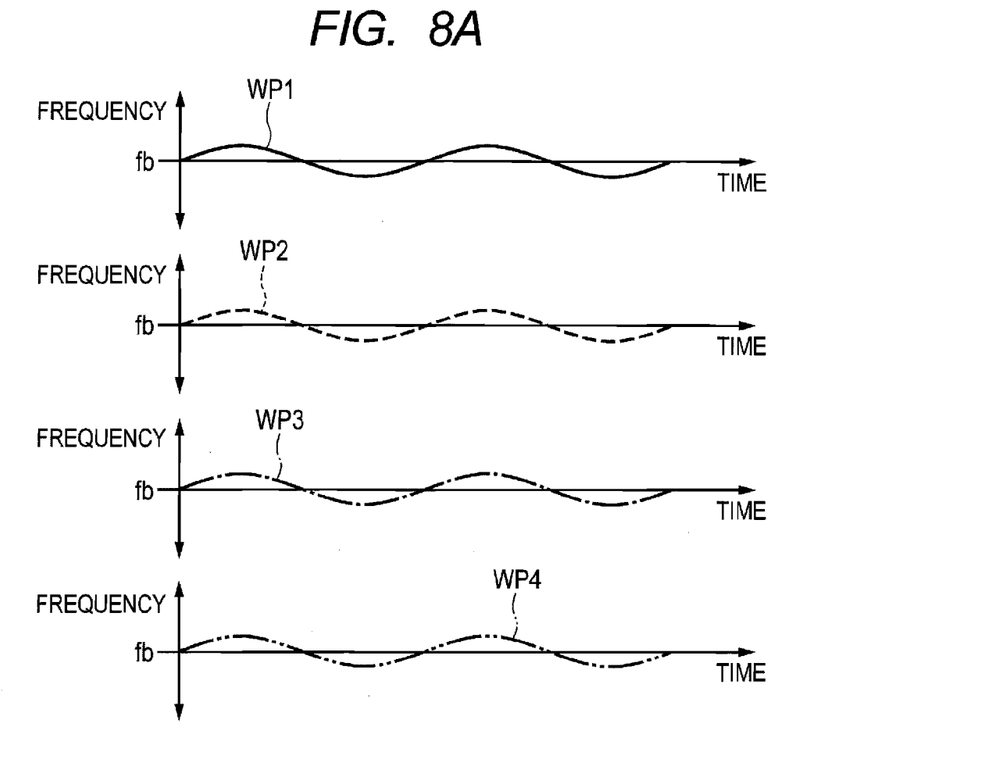
FIG. 8A is a diagram showing a modulated waveform of each scanning line when each scanning line is scanned at a reference period.
Figure 8B:
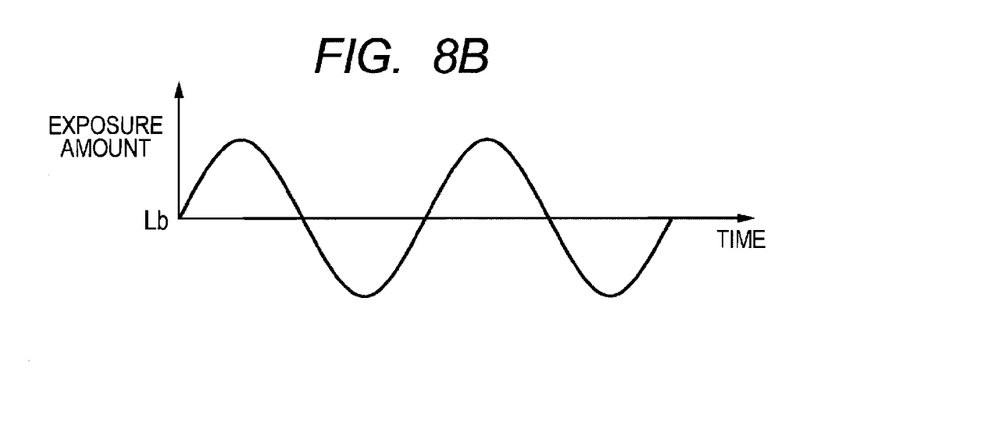
FIG. 8B is a diagram showing changes of exposure amounts of a plurality of pixels.

In a case where the reference period Tref is close to an integral multiple of the modulation cycle Tm, if writing start of each scanning line is performed at each reference period Tref, as shown in FIG. 8A, each modulated waveform WP1 to WP4 amplifies one another. Thus, as shown in FIG. 8B, deviations of the exposure amount relative to the reference value Lb become large. In this case, there is a possibility that an image quality deteriorates due to density variation in a print result, and so on.

Figure 7C:
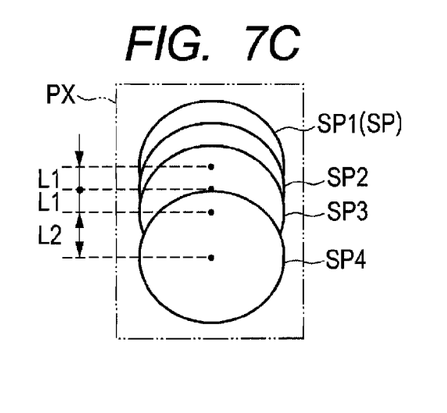
FIG. 7C is a diagram showing four exposure spots forming one pixel.

Note that both of a period from exposure start of the first scanning line SL1 to exposure start of the second scanning line SL2 and a period from exposure start of the second scanning line SL2 to exposure start of the third scanning line SL3 are the same first interval G1. Hence, as shown in FIG. 7C, the distances between the centers of each exposure spot SP1 to SP3 of the first to third lines are the same distance L1. On the other hand, a period from exposure start of the third scanning line SL3 to exposure start of the fourth scanning line SL4 is the second interval G2 longer than the first interval G1. Hence, the distance between the centers of each exposure spot SP3, SP4 of the third and fourth lines is a distance L2 longer than the distance L1. Thus, even in a case where the distances between the centers of each exposure spot SP1 to SP4 have variations, because each exposure spot overlaps, the exposure spots are printed as one pixel.

According to the above, the following effects can be obtained.

Because the intervals of exposure start time $ts_1$ to $ts_4$ are different (the exposure start time $ts_k$ is different from the reference time $tref_k$), the phases of the modulated waveforms WP1 to WP4 can be shifted in the plurality of scanning lines SL1 to SL4. Thus, without changing the modulation cycle Tm, differences between exposure amounts of the plurality of pixels PX can be reduced.

By increasing the number of scanning lines scanned during the first interval G1 shorter than the reference period Tref, the extra period (Tref-G1) can be used as the second interval G2. Thus, it is possible to greatly shift timing of starting writing the fourth scanning line SL4 for which exposure is started the second interval G2 after the exposure start of the third scanning line SL3.

In the above example, the number of the scanning lines SL1 to SL4 is four. Thus, for example, compared with an example in which the number of scanning line is three, it is possible to further increase an accumulated value of the extra period (Tref-G1) that is increased by increasing the number of scanning lines scanned during the first interval G1 shorter than the reference period Tref. Hence, the timing of starting writing the scanning line (SL4) can be shifted by a greater amount.

While the disclosure has been described in detail with reference to the above aspects thereof, it would be apparent to those skilled in the art that various changes and modifications may be made therein without departing from the scope of the claims.

In the above-described embodiment, the number n of the plurality of scanning lines SL1 to SL4 forming the plurality of pixels PX1 to PX256 arranged in the main scanning direction is four. However, the disclosure is not limited to this. The number may be n=3 or n≥5. But, in order to have a relationship that a pair of modulated waveforms is compensated each other as in the above-described embodiment, it is preferable that the number of scanning lines forming a plurality of pixels be an even number. That is, it is preferable that one or plurality of pair of two scanning lines having a relationship that modulated waveforms compensate each other exist within a range in the sub-scanning direction of one pixel array.

In the above-described embodiment, each exposure start time $ts_2$, $ts_3$ of the second scanning line SL2 and the third scanning line SL3 is set to time earlier than each reference time $tref_2$, $tref_3$, and the exposure start time $ts_4$ of the fourth scanning line SL4 is set to time that is later than the reference time $tref_4$. However, the disclosure is not limited to this. For example, exposure start time of the second scanning line or the third scanning line may be set to time later than the corresponding reference time.

In the above-described embodiment, as an example of control of the light emitting element LD by the driver 112, in a case where the number of clocks allocated to one exposure spot SP is 80 clocks, light is emitted during a period corresponding to 60 clocks, out of 80 clocks. However, the disclosure is not limited to this. For example, considering difference of the light amount caused by lighting efficiency of each light emitting element, correction of preset lighting period (the number of clocks) for correcting the difference may be performed. Specifically, in a case where the number of clocks allocated to one exposure spot SP is 80 clocks, light may be emitted during a period corresponding to 60±A clocks, out of 80 clocks. Here, ±A clocks is a correction value of exposure amount that is preset for each light emitting element based on the lighting efficiency of each light emitting element.

In the above-described embodiment, the SLED chip 41A is shown as an example of an exposing unit. This disclosure is not limited to this. For example, the exposing unit may be any device as long as the exposing unit has a plurality of light emitters arranged in the main scanning direction.

In the above-described embodiment, the photosensitive drum 53 is shown as an example of a photosensitive member. This disclosure is not limited to this. The photosensitive member may be a belt-shaped photosensitive member, for example.

In the above-described embodiment, this disclosure is applied to the color printer 1. This disclosure is not limited to this, and may be applied to other image forming apparatuses, such as a monochromatic printer, a copier, and a multifunction peripheral (MFP).

What is claimed is:

1. An exposing device comprising:
   an exposing unit having a plurality of light emitters arranged in a main scanning direction, the exposing unit being configured to form a scanning line by exposing an image surface in the main scanning direction, and to form a plurality of pixels arrayed in the main scanning direction by sequentially forming a particular number of scanning lines shifted in a sub-scanning direction, each of the particular number of scanning lines having a plurality of spots arranged in the main scanning direction, each of the plurality of pixels being formed by the particular number of spots arranged in the sub-scanning direction;
   a clock generator configured to generate frequency-spread clocks having frequency that is spread with a particular modulation cycle; and
   a driver configured to drive each of the plurality of light emitters of the exposing unit to emit light during a lighting period based on the frequency-spread clocks to form one spot, the driver being configured to set an interval of exposure start time of the particular number of scanning lines,
   wherein at least one interval of exposure start time is different from a reference period that is obtained by dividing a period for forming the plurality of pixels arrayed in the main scanning direction by the particular number; and
   wherein the particular number of scanning lines exists within a range in the sub-scanning direction of one pixel array, the particular number of scanning lines having a relationship such that modulated waveforms of the particular number of scanning lines compensate each other, the modulated waveforms being formed with the particular modulation cycle.

2. The exposing device according to claim 1, wherein the at least one interval is shorter than the reference period.

3. The exposing device according to claim 1, wherein the at least one interval is longer than the reference period.

4. The exposing device according to claim 1, wherein a first interval is defined as the interval shorter than the reference period;
   wherein a second interval is defined as the interval longer than the reference period; and
   wherein a number of the first interval is larger than a number of the second interval.

5. The exposing device according to claim 1, wherein the number of the particular number of scanning lines n forming the plurality of pixels arrayed in the main scanning direction is larger than or equal to four (n≥4).

6. The exposing device according to claim 1, wherein an exposure period of each of the particular number of scanning lines is shorter than or equal to 90% of the reference period.

7. The exposing device according to claim 1, wherein a modulated waveform corresponding to the modulation cycle has such a shape that frequency changes in a sine wave with respect to time.

8. The exposing device according to claim 1, wherein the driver is configured to drive the exposing unit to emit light during a period corresponding to a predetermined number of the frequency-spread clocks, so as to form one pixel.

9. An exposing device comprising:
   an exposing unit having a plurality of light emitters arranged in a main scanning direction, the exposing unit being configured to form a scanning line by exposing an image surface in the main scanning direction, and to form a plurality of pixels arrayed in the main scanning direction by sequentially forming a plurality of scanning lines shifted in a sub-scanning direction:
   a clock generator configured to generate frequency-spread clocks having frequency that is spread with a particular modulation cycle; and
   a driver configured to drive the exposing unit to emit light during a lighting period based on the frequency-spread clocks, the driver being configured to set an interval of exposure start time of the plurality of scanning lines,
   wherein at least one interval is different from a reference period that is obtained by dividing a period for forming the plurality of pixels arrayed in the main scanning direction by a number of the plurality of scanning lines;
   wherein the number of the plurality of scanning lines forming the plurality of pixels arrayed in the main scanning direction is an even number; and
   wherein one or a plurality of pairs of two scanning lines exists within a range in the sub-scanning direction of one pixel array, the one or plurality of pairs of two scanning lines having a relationship such that modulated waveforms of each pair of the two scanning lines compensate each other.

10. An exposing device comprising:
    an exposing unit having a plurality of light emitters arranged in a main scanning direction, the exposing unit being configured to form a scanning line by exposing an image surface in the main scanning direction, and to form a plurality of pixels arrayed in the main scanning direction by sequentially forming a particular number of scanning lines shifted in a sub-scanning direction, each of the particular number of scanning lines having a plurality of spots arranged in the main scanning direction, each of the plurality of pixels being formed by the particular number of spots arranged in the sub-scanning direction;
    a clock generator configured to generate frequency-spread clocks having frequency that is spread with a particular modulation cycle; and
    a driver configured to drive each of the plurality of light emitters of the exposing unit to emit light during a lighting period based on the frequency-spread clocks to form one spot,
    wherein a reference period Tref is defined as a period that is obtained by dividing a period for forming the plurality of pixels arrayed in the main scanning direction by the particular number n; and
    wherein, when a reference time $tref_1$ is defined as time identical to exposure start time $ts_1$, and reference times $tref_2$ to $tref_n$ are defined as respective times shifted from the reference time $tref_1$ by the reference period Tref, at least one exposure start time $ts_k$ out of exposure start times $ts_2$ to $ts_n$ of each scanning line is different from a reference time $trek_k$; and
    wherein the particular number of scanning lines exists within a range in the sub-scanning direction of one pixel array, the particular number of scanning lines having a relationship such that modulated waveforms of the particular number of scanning lines compensate each other, the modulated waveforms being formed with the particular modulation cycle.

11. The exposing device according to claim 10, wherein the at least one exposure start time $ts_k$ is earlier than the reference time $tref_k$.

12. The exposing device according to claim 10, wherein the at least one exposure start time $ts_k$ is later than the reference time $tref_k$.

13. The exposing device according to claim 10, wherein, out of the particular number of scanning lines, a number of scanning lines for which scanning is started at an exposure start time earlier than a corresponding reference time is larger than a number of scanning line for which scanning is started at exposure start time later than a corresponding reference time.

14. The exposing device according to claim 10, wherein the number of the particular number of scanning lines n forming the plurality of pixels arrayed in the main scanning direction is larger than or equal to four ($n \geq 4$).

15. exposing device according to claim 10, wherein an exposure period Te of each of the particular number of scanning lines is shorter than or equal to 90% of the reference period Tref.

16. The exposing device according to claim 10, wherein a modulated waveform corresponding to the modulation cycle has such a shape that frequency changes in a sine wave with respect to time.

17. The exposing device according to claim 10, wherein the driver is configured to drive the exposing unit to emit light during a period corresponding to a predetermined number of the frequency-spread clocks, so as to form one pixel.

18. The exposing device according to claim 10, wherein the number of the particular number of scanning lines forming the plurality of pixels arrayed in the main scanning direction is an even number; and
wherein one or a plurality of pairs of two scanning lines exists within a range in the sub-scanning direction of one pixel array, the one or plurality of pairs of two scanning lines having a relationship such that modulated waveforms of each pair of the two scanning lines compensate each other.

19. The exposing device according to claim 10, wherein the number of the particular number of scanning lines forming the plurality of pixels arrayed in the main scanning direction is four;
wherein exposure start time $ts_2$ of a second scanning line out of the particular number of scanning lines is earlier than a corresponding reference time $tref_2$ by Tm/4, where Tm is the modulation cycle;
wherein exposure start time $ts_3$ of a third scanning line out of the particular number of scanning lines is earlier than a corresponding reference time $tref_3$ by Tm/2; and
wherein exposure start time $ts_4$ of a fourth scanning line out of the particular number of scanning lines is later than a corresponding reference time $tref_4$ by Tm/4.

* * * * *